United States Patent
Colomer et al.

(10) Patent No.: US 11,945,618 B2
(45) Date of Patent: Apr. 2, 2024

(54) SEALING MACHINE AND A METHOD FOR SEALING A SEALING MATERIAL

(71) Applicant: MULTIVAC SEPP HAGGENMUELLER SE & CO. KG, Wolfertschwenden (DE)

(72) Inventors: Carles Colomer, Blanes (ES); Gerard Maltas, Barcelona (ES); Carles Verdugo, Mataro Barcelona (ES)

(73) Assignee: Multivac Sepp Haggenmueller SE & Co. KG, Wolfertschwenden (DE)

( * ) Notice: Subject to any disclaimer, the term of this patent is extended or adjusted under 35 U.S.C. 154(b) by 0 days.

(21) Appl. No.: 17/966,656

(22) Filed: Oct. 14, 2022

(65) Prior Publication Data

US 2023/0120336 A1 Apr. 20, 2023

(30) Foreign Application Priority Data

Oct. 15, 2021 (EP) .................................... 21382928

(51) Int. Cl.
| | |
|---|---|
| *B65B 51/16* | (2006.01) |
| *B65B 9/20* | (2012.01) |
| *B65B 51/26* | (2006.01) |
| *B65B 51/10* | (2006.01) |

(52) U.S. Cl.
CPC ............ *B65B 51/16* (2013.01); *B65B 9/2021* (2013.01); *B65B 9/2028* (2013.01); *B65B 51/26* (2013.01); *B65B 2051/105* (2013.01); *B65B 2220/08* (2013.01)

(58) Field of Classification Search
CPC ..... B65B 9/067; B65B 9/2021; B65B 9/2028; B65B 51/16; B65B 51/26; B65B 2051/105; B65B 2220/08; B29C 66/133
USPC ...................................... 53/550, 374.4, 375.4
See application file for complete search history.

(56) References Cited

U.S. PATENT DOCUMENTS

| | | | | |
|---|---|---|---|---|
| 4,249,364 A | * | 2/1981 | Kawasaki et al. ...... | B65B 51/16 53/374.6 |
| 4,525,977 A | * | 7/1985 | Matt ....................... | B65B 9/067 53/550 |
| 4,574,566 A | * | 3/1986 | Eaves et al. ............ | B65B 9/067 53/550 |

(Continued)

FOREIGN PATENT DOCUMENTS

| | | | |
|---|---|---|---|
| CH | 423206 A * | 10/1966 | ............. B65B 51/16 |
| DE | 10 2012 223072 A1 | 6/2014 | |

(Continued)

OTHER PUBLICATIONS

European Search Report dated May 12, 2022, Application No. 21382928.-1014, Applicant Multivac Sepp Haggenmueller SE & Co. KG, 7 Pages.

*Primary Examiner* — Stephen F. Gerrity
(74) *Attorney, Agent, or Firm* — Brooks Kushman P.C.

(57) ABSTRACT

A sealing machine is provided for sealing a sealing material by heating a fin of the sealing material wrapped around a product. The sealing machine comprises, in a transport direction of the sealing material, a pair of tracking rollers for tensioning the sealing material and a pair of heating rollers for sealing the sealing material by applying heat to the fin when the fin is moved between the pair of heating rollers. Furthermore, the pair of tracking rollers and the pair of heating rollers are configured to be driven independently.

20 Claims, 4 Drawing Sheets

(56) References Cited

U.S. PATENT DOCUMENTS

| | | | |
|---|---|---|---|
| 5,826,403 A | 10/1998 | Haley | |
| 6,098,380 A * | 8/2000 | Goodwin et al. | B65B 9/2021 53/551 |
| 6,217,689 B1 * | 4/2001 | Gehret | B29C 66/133 156/203 |
| 9,688,431 B2 | 6/2017 | Maj et al. | |
| 2017/0327258 A1 * | 11/2017 | Nomura | B65B 51/16 |

FOREIGN PATENT DOCUMENTS

| | | |
|---|---|---|
| DE | 10 2019 127383 A1 | 4/2021 |
| EP | 0 461 689 A1 | 12/1991 |
| EP | 0 638 476 A1 | 2/1995 |
| EP | 0 773 164 A1 | 5/1997 |
| JP | 2003212222 A * | 7/2003 |

* cited by examiner

SEALING MACHINE AND A METHOD FOR SEALING A SEALING MATERIAL

CROSS-REFERENCE TO RELATED APPLICATIONS

This application claims foreign priority benefits under 35 U.S.C. § 119(a)-(d) to European patent application number EP 21382928.6, filed Oct. 15, 2021, which is incorporated by reference in its entirety.

TECHNICAL FIELD

The present disclosure relates to a sealing machine for sealing a sealing material by heating a fin of a sealing material wrapped around a product and a method for sealing a sealing material by heating a fin of the sealing material wrapped around a product by a sealing machine.

BACKGROUND

Methods and systems for sealing various kinds of sealing materials have been known for several years.

There are different concepts of how a sealing material, like a plastic foil, can be wrapped around a product. One of those approaches is to use a sheetlike material and wrap it around a product so that the sheetlike sealing material is closed about the product forming a fin by the edges of the sealing material.

This fin can then be sealed by pressing together the edges of the sealing material forming the fin and at the same time applying heat so that the material locally melts and comes a sealing.

Further sealing steps may be performed by for example applying a "cross sealing" that also seals edges of the sealing material that run approximately perpendicular to the transport direction of the sealing material with the product therein.

Depending on the characteristics of the sealing material, the tension applied to the sealing material by the heating rollers of the sealing machine and the tracking rollers of the sealing machine that contact the sealing material in the region of the fin of the sealing material has impact on the quality of the sealing.

Depending on the characteristics of the sealing material, the sealing machine has to be adjusted so as to ensure proper sealing. Converting of the machine to take into account different properties of the sealing material is, however, labor-intensive and results in downtimes of the machine.

SUMMARY

In view of the above, one object addressed by the present disclosure is to increase the usability of a sealing machine in view of changing characteristics of sealing material used while at the same time reducing the downtimes involved in adjusting the sealing machine to sealing material properties.

This object is addressed by the sealing machine for sealing a sealing material by heating a fin of a sealing material wrapped around a product according to the disclosure and a method for sealing a sealing material by heating a fin of the sealing material wrapped around a product by a sealing machine according to the disclosure.

According to the disclosure, a sealing machine for sealing a sealing material by heating a fin of a sealing material wrapped around a product is provided, the sealing machine comprising, in a transport direction of a sealing material, a pair of tracking rollers for tensioning a sealing material and a pair of heating rollers for sealing a sealing material by applying heat to a fin moved between the set of heating rollers, wherein the pair of tracking rollers and the pair of heating rollers are driven independently.

In the context of the present disclosure, the independent driving of the pair of tracking rollers and the pair of heating rollers is to be understood as meaning that characteristics of the rotation of the pair of heating rollers (including for example the rotational position, the rotational speed or the rotational acceleration) can be controlled and adjusted independent from the corresponding characteristics of the pair of heating rollers and vice versa. Particularly, the rotational speed of the tracking rollers can be controlled so as to be different from the rotational speed of the pair of heating rollers.

In summary, the above may particularly be understood as meaning that the pair of tracking rollers and the pair of heating rollers are driven independently from each other.

Within the present disclosure, it is encompassed that even though the rotational characteristics of the pair of tracking rollers and the pair of heating rollers can be adjusted and controlled independently, they may nevertheless, when in use, have the same rotational velocity depending on the circumstances. It is further encompassed that the characteristics of the rotation (or generally movement) of the pair of heating rollers differs from the pair of tracking rollers.

By independently driving the pair of tracking rollers and the pair of heating rollers, different requirements regarding the tension applied to the sealing material can be realized without having to physically adjust the sealing machine. Thereby, downtimes are reduced while at the same time allowing for adjustment of the sealing machine to changing sealing material properties.

In one embodiment, a first drive is associated with the pair of tracking rollers and a second drive is associated with the pair of heating rollers, wherein the first drive and the second drive are independent from each other.

Providing two independent drives, for example a first servomotor and a second servomotor, realizes the independent driving of the pair of tracking rollers at the pair of heating rollers in a reliable and technically simple way.

In a further embodiment, the sealing machine comprises, downstream of the pair of tracking rollers, a second pair of heating rollers, wherein the second pair of heating rollers can be disabled so as to not contact a fin moved between the second pair of heating rollers.

These additional heating rollers can be provided, for example, downstream of the pair of tracking rollers but upstream of the pair of heating rollers or they can be provided even further downstream of the pair of heating rollers. Providing two pairs of heating rollers where one of the pairs of heating rollers can be moved between a disabled state, where it does not contact the fin, and an enabled state, where it is in contact with the fin, can be advantageous in cases of sealing material being used that requires two heating rollers for realizing reliable tensioning of the fin, thereby also improving the quality of the sealing for example in case of sealing material being used that is more difficult to stretch.

In a more specific embodiment, the second pair of heating rollers is movable in a plane that is substantially perpendicular to the transport direction of the sealing material between a sealing state where the second pair of heating rollers can contact a fin moved between the second pair of heating rollers and a disabled state where the second pair of heating rollers cannot contact a fin moved between the second pair of heating rollers.

Thereby, a reliable moving away of the second pair of heating rollers so as to disable them or enable them is provided. Unintended stretching of the fin by means of the second pair of heating rollers is thereby avoided reliably.

In a further embodiment, the sealing machine comprises an actuation mechanism for moving the second pair of heating rollers.

This actuation mechanism can, for example, be automatically, like a servomotor, and can be, for example, controlled via the control unit of the sealing machine, for example. Alternatively, the actuation mechanism may comprise or may be a manually movable mechanism like, for example, a handwheel or a lever. An operator actuating the handwheel or the lever can then switch the second pair of heating rollers between the enabled and the disabled state.

In one embodiment, the second pair of heating rollers is driven jointly with the pair of heating rollers or the second pair of heating rollers is driven independently from the pair of heating rollers and the tracking rollers.

Jointly driving may encompass that a single driving mechanism, for example a servomotor, is provided for driving both pairs of heating rollers. This simplifies the construction. Alternatively, realizing the first pair of heating rollers and the second pair of heating rollers as independently driven from each other and from the pair of tracking rollers allows for adjusting the tension of the fin of the sealing material also between the heating rollers, which can be advantageous in applications where the sealing material requires additional tensioning.

It can also be provided that the sealing machine comprises a control unit, wherein the control unit is adapted to enable and disable the second pair of heating rollers based on an input of a user.

The control unit can, for example, be adapted to enable or disable the second pair of heating rollers depending on the sealing material actually used. If, for example, the user provides an input specifying the sealing material or if the sealing material is identified in another way, for example by scanning a barcode, the control unit can automatically or at least semi-automatically (for example upon and in response to confirmation of the operator of the sealing machine) control the second pair of heating rollers so as to enable or disable them.

Reliable control of enabling or disabling the second pair of heating rollers is thereby provided.

In a more specific realization, the control unit is adapted to control the driving of the pair of tracking rollers and/or the pair of heating rollers and/or the second pair of heating rollers.

Controlling the driving may, for example, encompass controlling the rotational speed and/or acceleration of rotation and/or rotational position of the respective pair of tracking rollers and the pair of heating rollers and potentially also the second pair of heating rollers. Thereby, specific characteristics regarding the tensioning and the movement of the sealing material can be realized.

The present disclosure further relates to a method for sealing a sealing material by heating a fin of the sealing material wrapped around a product by a sealing machine, the sealing machine comprising, in a transport direction of the sealing material, a pair of tracking rollers that tension the sealing material and a pair of heating rollers that seal the sealing material by applying heat to the fin of the sealing material moved between the pair of heating rollers, wherein the pair of tracking rollers and the pair of heating rollers are driven independently, wherein the method comprises adjusting a tension of the sealing material by driving the pair of tracking rollers and the pair of heating rollers.

With this method, a reliable tensioning of the sealing material is realized also in cases where different kinds of sealing material are used that require different tensioning.

In one embodiment, a first drive is associated with the pair of tracking rollers and a second drive is associated with the pair of heating rollers, wherein the first drive and the second drive are independent from each other.

The drives can be realized as servomotors, for example. This realizes flexible control and at the same time independent movement of the tracking rollers and heating rollers.

It can further be provided that the sealing machine comprises, downstream of the pair of tracking rollers, a second pair of heating rollers, wherein the second pair of heating rollers can be disabled so as to not contact a fin moved between the second pair of heating rollers, wherein the method comprises disabling or enabling the second pair of heating rollers depending on a tension to be applied to the sealing material.

Thereby, also sealing materials that require different tensioning can be performed without this requiring structural modification of the machine that would be time consuming.

In a more specific embodiment, the second pair of heating rollers is moved in a plane that is substantially perpendicular to the transport direction of the sealing material between a sealing state where the second pair of heating rollers contacts a fin moved between the second pair of heating rollers and a disabled state where the second pair of heating rollers does not contact a fin moved between the second pair of heating rollers.

The movement in a plane that is substantially perpendicular to the transport direction may encompass also cases where the movement of the second pair of heating rollers (or at least one roller of this second pair of heating rollers), when seen from above the arrangement of rollers, occurs in a curved plane or in a direction that is slightly inclined (for example by up to 10° or up to 20°) compared to a plane that is exactly perpendicular to the transport direction of the sealing material and/or the fin. Each of those embodiments can be advantageous to realize a simple construction while ensuring flexible movement of the second pair of heating rollers.

In one embodiment, the sealing machine comprises an actuation mechanism for moving the second pair of heating rollers between the disabled state and the sealing state.

This actuation mechanism can be implemented automatically or manually or semi-automatically, for example requiring user interaction or at least a user input or confirmation for actuating the second pair of heating rollers.

In a further embodiment, the second pair of heating rollers is driven jointly with the pair of heating rollers or wherein the second pair of heating rollers is driven independently from the pair of heating rollers and the tracking rollers.

Depending on the characteristics of used sealing material, it can be advantageous to jointly drive the first pair of heating rollers and the second pair of heating rollers to thereby ensure that no different tensioning between the first pair of heating rollers and the second pair of heating rollers is applied. Alternatively, it can be advantageous if such different tensioning is possible.

In a further embodiment, the sealing machine comprises a control unit, wherein the control unit switches the second pair of heating rollers between the disabled state and the sealing state based on an input of a user; and/or wherein the control unit is adapted to control the driving of the pair of tracking rollers and/or the pair of heating rollers and/or the second pair of heating rollers.

With this, the switching between the enabled state and the disabled state can be user-controlled otherwise automatically, reducing the interaction of a user or operator with the sealing machine, thereby reducing the risk of injuries.

DETAILED DESCRIPTION

Figure 1:
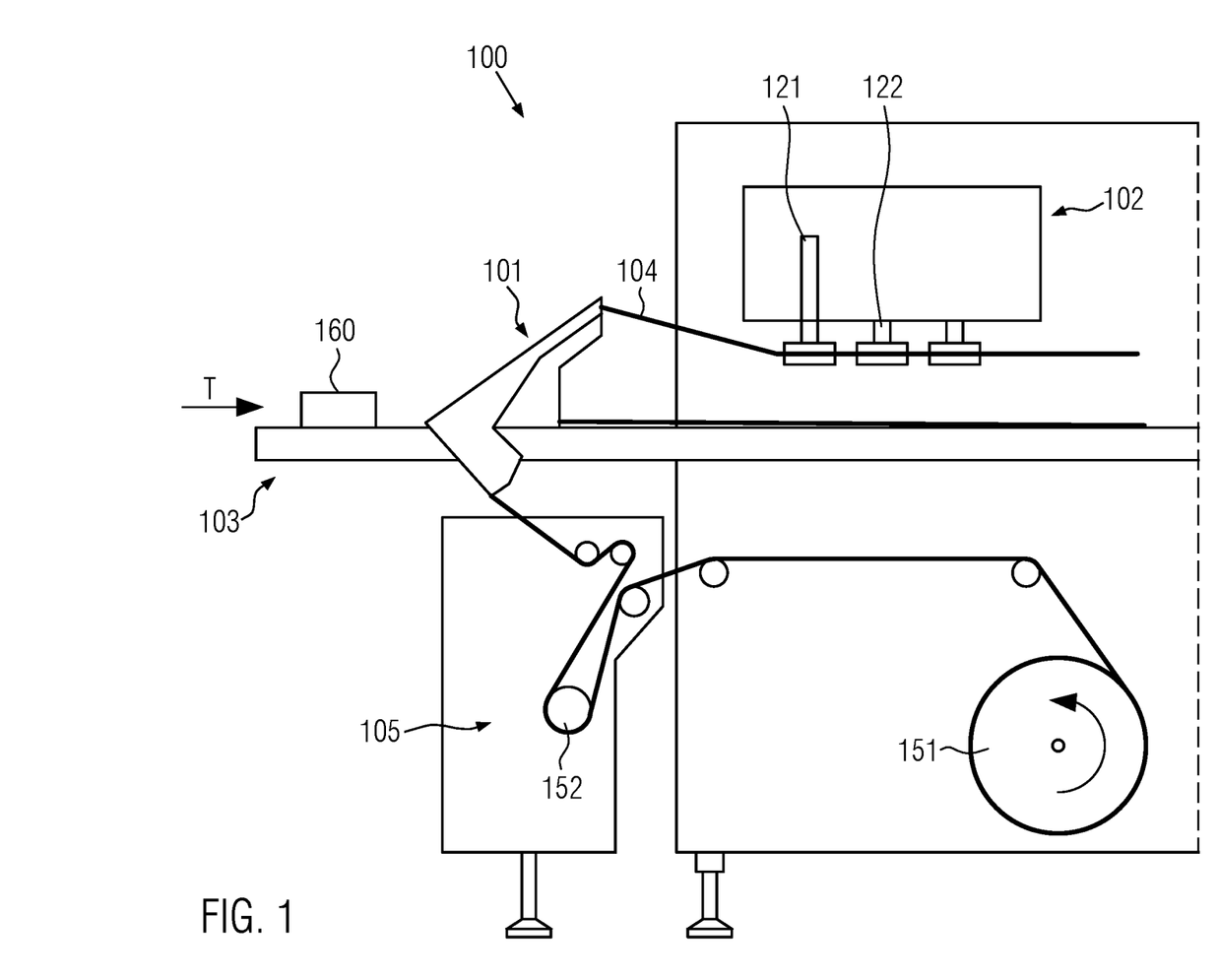
FIG. 1 shows a schematic depiction of a sealing machine according to one embodiment.

FIG. 1 shows a schematic side view on a sealing machine 100 according to one embodiment of the present disclosure.

Sealing machines are generally known to comprise a transporting device 103 for transporting products 160, like for example packages with food inside or any other kind of products that need sealing with a sealing material.

These packages are transported along a transport direction T schematically depicted with the arrow along the transporting device 103. Particularly, the transporting device may be implemented as a chain conveyor or other suitable conveyor for transporting the packages.

Additionally, the sealing machine 100 according to the present disclosure may comprise a provisioning system 105 for providing a sheetlike material. This provisioning system 105 may particularly comprise a sealing material roll 151 and further elements 152, like deflection rolls, that facilitate transporting of the sheetlike material so that it is provided, in the region of the transporting device 103, below the products 160.

The sealing machine according to the present disclosure is intended to fold the sheetlike material around the products so that a film of material is wrapped around the products, leaving, on top of the packages in the depiction provided here, a fin where the edges of the sealing material, in the transport direction T of the products, contact each other. This may realized by employing a forming set 101 that forms the sheetlike material so as to assume the respective shape so that the fin 104 (only schematically depicted here) is provided.

Downstream of the forming set 101, there may be provided a sealing station 102 of the sealing machine. This sealing station may at least comprises a pair of tracking rollers 121. These tracking rollers, as will be explained further below with reference to FIG. 2, contact the fin 104 of the sealing material and, due to the tracking rollers of the pair of tracking rollers 121 being rotated in the direction of the transport direction T, tension the fin 104 and therefore the sealing material. Downstream of this pair of tracking rollers 121, at least one pair of heating rollers 122 may be provided that can apply heat to the fin 104 that is moved between the pair of heating rollers 122. This can for example be realized by heating the material of the heating rollers of the pair of heating rollers 122 so that, by physically contacting the fin 104, a heat transfer occurs that heats the sealing material forming the fin.

Thereby, a sealing of the fin and thereby at least a longitudinal sealing of the product 160 is achieved.

Downstream of the sealing station 102 in the transport direction T of the products, further stations may be provided like, for example, a cross-sealing station that applies a sealing to the sealing material that extends in a direction substantially transverse to the transport direction T so as to seal the products also in the transverse direction.

Figure 2:
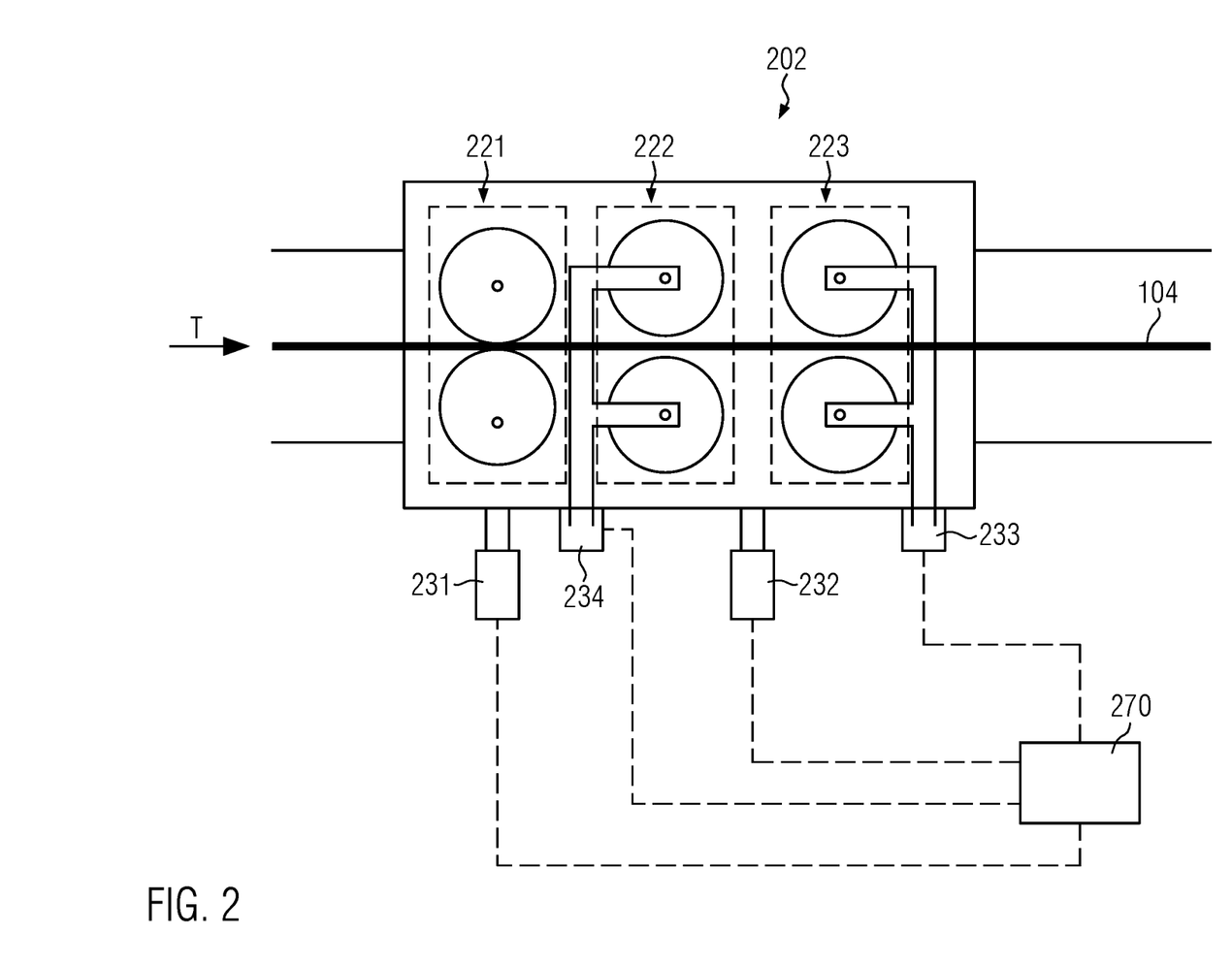
FIG. 2 shows a top view on a sealing station of the sealing machine of FIG. 1 according to one embodiment.

FIG. 2 shows a top view of the sealing station 202 as was depicted as sealing station 102 in FIG. 1.

As is seen here in more detail, the sealing station 202 comprises, in transport direction T of the fin 104 of the sealing material, a pair of tracking rollers 221. The tracking rollers are rotatable preferably about an axis of rotation that is perpendicular to the transport plane in which the products are transported. The axis of rotation will thus be perpendicular to the depicted plane of FIG. 2. The tracking rollers of the pair of tracking rollers 221 can be provided as flat, cylindrically shaped or conically shaped discs and may extend, in a direction perpendicular to the plane depicted here, about 1 cm or 2 cm or 3 cm or any value in between or more.

Preferably, the tracking rollers have a surface structure that has a comparably high friction coefficient with respect to the sealing material.

Particularly, the surface of each of the tracking rollers may comprise material having a friction coefficient with respect to a sealing material made from PET or other plastic materials that is larger than the friction coefficient of iron or PET or plastic with respect to the sealing material. Thereby, high friction between the fin 104 and the tracking rollers of the pair of tracking rollers 221 is ensured, resulting in reliable gripping and tensioning of the fin 104.

As is seen in FIG. 2, the fin 104 of the sealing material is transported between the tracking rollers of the pair of tracking rollers 221 along the transport direction T. Preferably, a drive, like a servomotor, 231 is associated with the pair of tracking rollers 221. While only one drive 231 is shown here that is associated with both tracking rollers for causing them to rotate, it can be provided that each of the tracking rollers is associated with one drive so that, in addition to the one drive 231 shown here, a further drive is provided for driving or rotating the other one of the tracking rollers of the pair of tracking rollers 221.

As is further shown in FIG. 2, in the transport direction of the fin 104, there is provided a first pair of heating rollers 222 and a second pair of heating rollers 223. According to embodiments of the present disclosure, there may only be one pair of heating rollers 222 or the second pair of heating rollers (either the pair 222 or the pair 223) may be switchable between an enabled state where the pair of heating rollers gets in contact with a fin 104 of the sealing material and a disabled state where they do not contact a fin of the sealing material.

The heating rollers of each of the pairs of heating rollers 222 and 223 are likewise provided so as to get into contact with the fin 104 of the sealing material and are further adapted to applying heat to the fin of the sealing material in the region of contact where the heating rollers contact the fin. By pressing together the edges of the sealing material forming the fin 104 and at the same time applying heat to this pressed-together section, a sealing of the fin 104 of the sealing material is obtained, thereby applying a longitudinal sealing of the sealing material along the fin.

The heating rollers of the pairs of heating rollers can be structured in the same way as the tracking rollers and may additionally or alternatively also be provided with a high friction coefficient material as explained above with respect to the tracking rollers. Thereby, the physical contact of the heating rollers with the to be heated sealing material may be improved, resulting in a reliable sealing.

According to embodiments of the present disclosure, the pair of heating rollers 222 and/or 223 are associated with a further drive 232 that can be driven independent from the drive 231 for the pair of tracking rollers 221. Thereby, the pairs of heating rollers (or at least one of them) can be driven independent from the pair of tracking rollers, allowing for adjusting the tension applied to the fin 104 of the sealing material between the pair of tracking rollers 221 and the pair of heating rollers 222 and/or 223.

While, in some embodiments, the drive 231 and 232 are integrated as a single drive, it is preferred that there are provided two structurally independent drives, like two servomotors, where one of them is associated with the pair of tracking rollers 221 and one of them is associated with the pair(s) of heating rollers 222 and/or 223.

Additionally, it can be provided that each pair of heating rollers 222 and 223 is associated with one drive so that instead of a single drive 232 for driving the first and second pair of heating rollers, two drives can be provided in some embodiments where the first drive may be associated with the first pair of heating rollers 222 and the second drive may be associated with the second pair of heating rollers 223. Additionally or alternatively, like for the pair of tracking rollers 221, it can also be provided that each of the heating rollers of each pair of heating rollers is associated with a single drive.

Figure 3A:
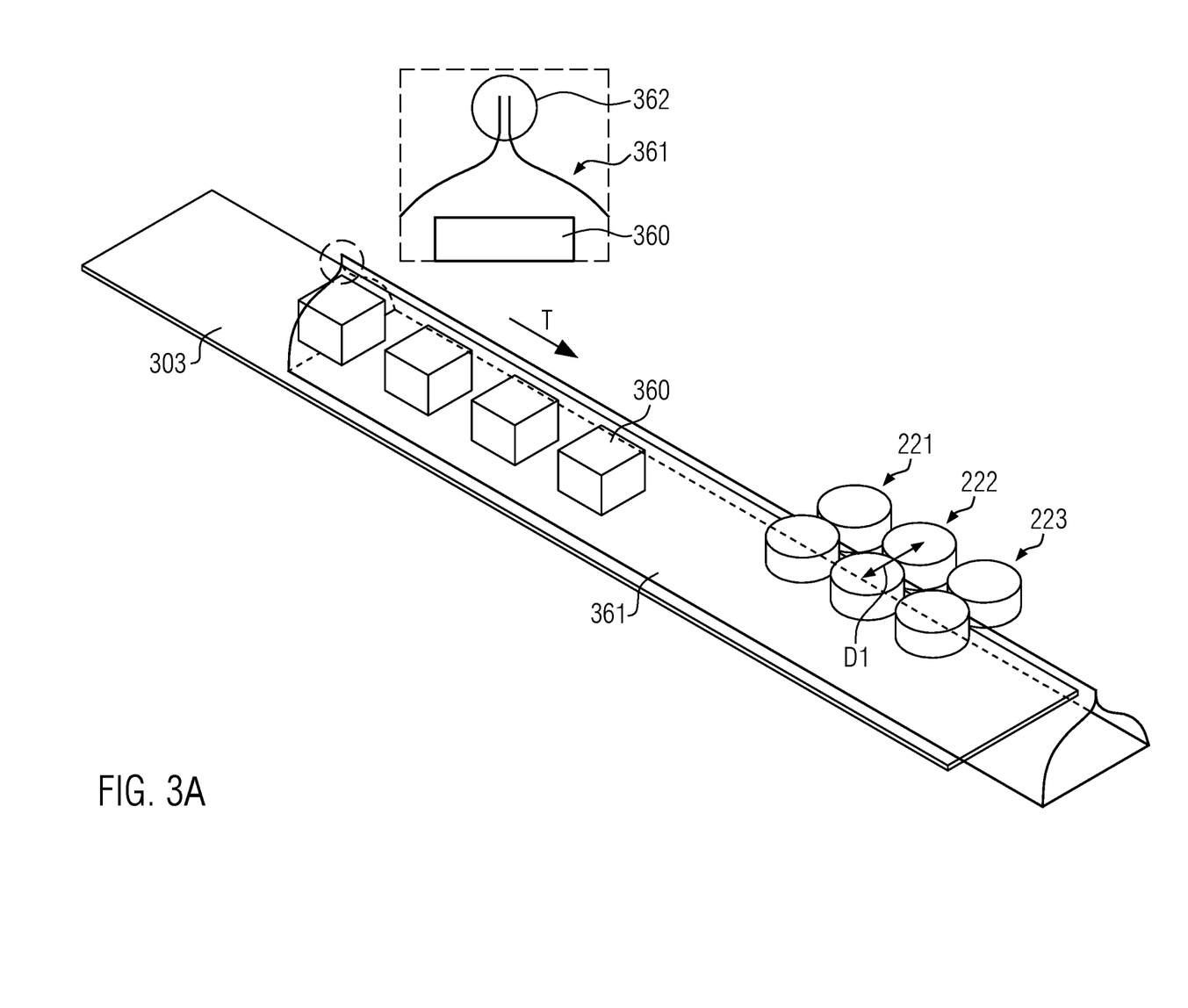
FIGS. 3A and 3B show a schematic depiction of adjusting a second pair of heating rollers according to one embodiment.
Figure 3B:
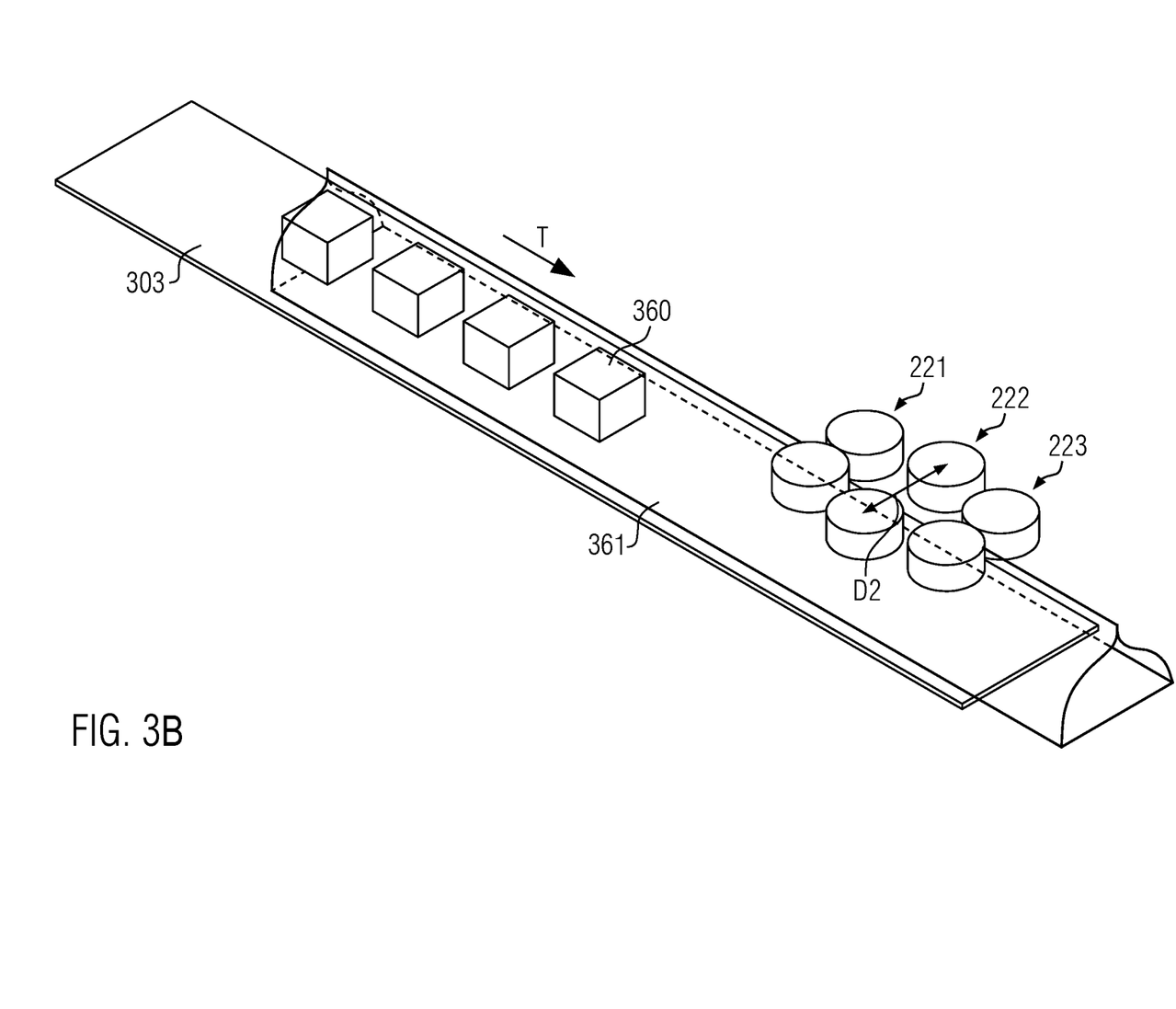

Furthermore, in some embodiments, there can be provided at least one actuation mechanism 233 and/or 234 for moving at least one pair of the heating rollers 222 or 223 in a plane that is substantially perpendicular to the transport direction T as will be further explained with respect to FIGS. 3A and 3B. The actuation mechanisms 233 and 234 can, for example, be provided as a spindle that allows for adjusting the distance of the heating rollers of a pair of heating rollers 222 and/or 223 relative to the fin 104 of the sealing material or relative to a central axis of the transporting device 103 as described in relation to FIG. 1.

Thereby, it is possible to increase the distance of the heating rollers of a pair of heating rollers to the fin, thereby disabling the heating rollers when they are provided in a distance that is insufficient for making contact with the fin. With this, a pair of heating rollers, for example the pair 222 or the pair 223, can be disabled so as to not heat the fin 104. This can realize at least one advantage of preventing excessive heat being provided to the fin 104 (thereby potentially causing damage to the fin 104) and/or adjusting the tension applied to the fin of the sealing material. This can be advantageous in cases where the sealing machine according to embodiments of the present disclosure is to be used with different kinds of sealing material. For example, sealing material having a comparably large material thickness requires more heat and potentially also more tension to be applied in order to provide a reliable seal to the fin 104. In that case, the two pairs of heating rollers 222 and 223 may be used and provided in the enabled state where they make contact with the fin 104. Other sealing materials, particularly thinner sealing materials, may require less heat and/or less tension. In such cases, it may then be sufficient and even advantageous to only use one of the pair of heating rollers. In such cases, at least one actuation mechanism may be actuated so as to move one of the pairs of heating rollers 222 and 223 from the enabled state (also referred to herein as sealing state) to the disabled state.

While the embodiment of FIG. 2 depicts two actuation mechanisms 233 and 234, it can be provided that only one actuation mechanism is provided so as to only provide one pair of heating rollers in a manner that this pair can be enabled or disabled.

In this respect, in one embodiment, the pair of heating rollers that comes first in the direction downstream of the pair of tracking rollers 221 can be provided with an actuation mechanism like the actuation mechanism 234 or the second pair of heating rollers 223 can be provided with an actuation mechanism 233. This may depend on the circumstances and the actual requirements of the sealing material. If both pairs of heating rollers are provided with corresponding actuation mechanisms 233 and 234, the highest flexibility is obtained with respect to enabling and disabling heating rollers.

In FIG. 2, a control unit 270 is shown that is preferably in communication with the actuation mechanism 233 and/or the actuation mechanism 234 for enabling and/or disabling one of the pairs or both pairs of heating rollers 222 and 223. Additionally, it can be provided that the control unit 270 is communicatively coupled with the drives 232 and/or 231 for driving the pair of tracking rollers and the pair of heating rollers or the pairs of heating rollers. In some embodiments, a user can provide an input via an input device (like a touchscreen or a keyboard) to the control unit 270 indicating that the actuation mechanism for enabling or disabling a pair of heating rollers is to be actuated so as to switch the pair of heating rollers between the enabled state and the disabled state.

Additionally or alternatively, the control unit 270 can be used to independently control the drives 231 and 232 so as to independently control the rotation of the pair of tracking rollers 221 and the pair(s) of heating rollers 222 and/or 223. Thereby, the tension applied to the fin can be adjusted as need be. Particularly, the control unit 270 can be realized as a computer with an associated memory including stored computer executable instructions for performing the functions, operations, steps, and/or methods described herein.

In some embodiments, the memory may contain data that is indicative of requirements regarding the enabling and/or disabling of pairs of heating rollers and the required tension for a specific sealing material. Depending on the sealing material used, the control unit can then automatically adjust the drives 231 and 232 and/or the enabling and/or disabling of the pairs of heating rollers by controlling the actuation mechanism(s) 233 and/or 234. For example, a user can input information identifying the sealing material to be used and, based on this input information, the control unit 270 can provide corresponding adjustments and control to the drives 231 and/or 232 or actuate one or both of the actuation mechanisms 233 and 234.

Additionally or alternatively, the control unit may automatically identify the sealing material (for example via an identification of the sealing material by means of the roller 151. It may comprise specific marks or barcodes that can be identified by the control unit, for example by using specific identification means like a code scanner. Based on the identified sealing material, the adjusting of the characteristics of the drives 231 and 232 and the enabling and/or disabling of the pairs of heating rollers can be controlled.

FIGS. 3A and 3B show one mode of adjusting the pairs of heating rollers depending on the needs with respect to the tensioning and/or heating of the fin of the sealing material. In FIG. 3A, the products 360 are enveloped by the sealing material 361. As is shown in the slightly enlarged view that is taken in a plane perpendicular to the transport direction T in FIG. 3A, this enveloping is realized so that the sealing material 361 forms a fin 362 above the product 360. This fin 362 is then transported in the transport direction T first to the pair of tracking rollers 221 that rotate with a velocity so as to apply a required tension to the fin 362 and also optionally pressing together the two edges of the sealing material 361 that formed the fin 362.

Subsequently, in the transport direction T, the fin 362 passes the two pairs of heating rollers 222 and 223. In the situation depicted in FIG. 3A, both pairs of heating rollers 222 and 223 are enabled, where the first pair of heating rollers in the transport direction T downstream of the pair of tracking rollers 221 is adjustable, i.e., is associated with corresponding actuating means as explained in relation to FIG. 2. In the here depicted enabled state, the rotational axes of the two heating rollers of the pair of heating rollers 222 may have a distance D1 that may be approximately equal (but slightly larger than) the sum of the radii of the heating rollers of the pair of heating rollers 222. Particularly, the distance D1 may be larger than the sum of the radii by an amount that corresponds to the thickness of the sealing material forming the fin 362 or it may correspond to 50% or 40% or 30% or less of that amount so as to ensure reliable pressing together of the sealing material when heating the fin.

This situation may be assumed, as explained above, in cases where the sealing material might require, for example, additional tensioning or heating.

In the situation in FIG. 3B, different sealing material 361 may be used that requires less tension and/or less heat. In this situation, the actuation mechanism as explained in relation to FIG. 2 may be actuated so as to disable the pair of heating rollers 222 by increasing the distance from the distance D1 to the shown distance D2. In this situation, the heating rollers of the pair of heating rollers 222 no longer contact the fin of the sealing material. The difference of D2–D1 may be a few millimeters up to a few centimeters, for example from 3 mm to 4 cm, particularly 1 cm to 4 cm, more particularly 2 cm to 3 cm. With this, it is ensured that the heating rollers of the pair of heating rollers 222 do not and cannot contact a fin 362 of sealing material 361 transported in between them. At the same time, the distance over which the heating rollers have to be moved is kept small, reducing the structural requirements to the actuation mechanism.

What is claimed is:

1. A sealing machine for sealing a sealing material by heating a fin of the sealing material wrapped around a product, the sealing machine comprising, in a transport direction of the sealing material, a pair of tracking rollers for tensioning the sealing material and a pair of heating rollers for sealing the sealing material by applying heat to the fin when the fin is moved between the pair of heating rollers, wherein the pair of tracking rollers and the pair of heating rollers are configured to be driven independently, wherein the sealing machine comprises, downstream of the pair of tracking rollers, a second pair of heating rollers, and wherein the second pair of heating rollers can be disabled so as to not contact the fin when the fin is moved between the second pair of heating rollers.

2. The sealing machine according to claim 1, further comprising a first drive associated with the pair of tracking rollers and a second drive associated with the pair of heating rollers, wherein the first drive and the second drive are independent from each other.

3. The sealing machine according to claim 1, wherein the second pair of heating rollers is movable in a plane that is substantially perpendicular to the transport direction of the sealing material between a sealing state where the second pair of heating rollers can contact the fin when the fin is moved between the second pair of heating rollers and a disabled state where the second pair of heating rollers cannot contact the fin when the fin is moved between the second pair of heating rollers.

4. The sealing machine according to claim 1, wherein the sealing machine comprises an actuation mechanism for moving the second pair of heating rollers.

5. The sealing machine according to am claim 1, wherein the second pair of heating rollers is configured to be driven jointly with the pair of heating rollers.

6. The sealing machine according to claim 1, wherein the second pair of heating rollers is configured to be driven independently from the pair of heating rollers and the pair of tracking rollers.

7. The sealing machine according to claim 1, wherein the sealing machine comprises a control unit, wherein the control unit is adapted to enable and disable the second pair of heating rollers based on an input of a user.

8. The sealing machine according to claim 7, wherein the control unit is adapted to control driving of the pair of tracking rollers and/or the pair of heating rollers and/or the second pair of heating rollers.

9. The sealing machine according to claim 1, wherein the second pair of heating rollers is arranged downstream of the pair of heating rollers with respect to the transport direction.

10. The sealing machine according to claim 1, wherein the pair of heating rollers is arranged downstream of the second pair of heating rollers with respect to the transport direction.

11. A method for sealing a sealing material by heating a fin of the sealing material wrapped around a product by a sealing machine, the sealing machine comprising, in a transport direction of the sealing material, a pair of tracking rollers that tension the sealing material and a pair of heating rollers that seal the sealing material by applying heat to the fin of the sealing material moved between the pair of heating rollers, wherein the pair of tracking rollers and the pair of heating rollers are driven independently, wherein the method comprises adjusting a tension of the sealing material by driving the pair of tracking rollers and the pair of heating rollers, wherein the sealing machine comprises, downstream of the pair of tracking rollers, a second pair of heating rollers, wherein the second pair of heating rollers can be disabled so as to not contact the fin moved between the second pair of heating rollers, and wherein the method comprises disabling, or enabling the second pair of heating rollers depending on a tension to be applied to the sealing material.

12. The method according to claim 11, wherein the sealing machine comprises a first drive associated with the pair of tracking rollers and a second drive associated with the pair of heating rollers, and wherein the first drive and the second drive are operated independently from each other.

13. The method according to claim 11, wherein the second pair of heating rollers is moved in a plane that is substantially perpendicular to the transport direction of the sealing material between a sealing state where the second pair of heating rollers contacts the fin moved between the second pair of heating rollers and a disabled state where the second pair of heating rollers does not contact the fin moved between the second pair of heating rollers.

14. The method according to claim 13, wherein the sealing machine comprises an actuation mechanism for moving the second pair of heating rollers between the disabled state and the sealing state.

15. The method according to claim 11, wherein the second pair of heating rollers is driven jointly with the pair of heating rollers.

16. The method according to claim 11, wherein the second pair of heating rollers is driven independently from the pair of heating rollers and the tracking rollers.

17. The method according to claim 11, wherein the sealing machine comprises a control unit, and wherein the control unit switches the second pair of heating rollers between a disabled state and a sealing state based on an input of a user.

18. The method according to claim 17, wherein the control unit is adapted to control driving of the pair of tracking rollers and/or the pair of heating rollers and/or the second pair of heating rollers.

19. The method according to claim 11, wherein the sealing machine comprises a control unit that is adapted to control driving of the pair of tracking rollers and/or the pair of heating rollers and/or the second pair of heating rollers.

20. The method according to claim 11, wherein the second pair of heating rollers is arranged downstream of the pair of heating rollers with respect to the transport direction, or the pair of heating rollers is arranged downstream of the second pair of heating rollers with respect to the transport direction.

* * * * *